Dec. 19, 1939.  F. A. KAVAN  2,183,868
WATER DISTRIBUTOR FOR ICE BOXES
Filed June 22, 1939  2 Sheets-Sheet 1

Inventor
By F. A. Kavan
Arthur H Sturges
Attorney

Dec. 19, 1939.   F. A. KAVAN   2,183,868
WATER DISTRIBUTOR FOR ICE BOXES
Filed June 22, 1939   2 Sheets-Sheet 2

Inventor
By F. A. Kavan
Arthur H. Sturges
Attorney

Patented Dec. 19, 1939

2,183,868

UNITED STATES PATENT OFFICE 2,183,868

WATER DISTRIBUTOR FOR ICE BOXES

Francis A. Kavan, Fremont, Nebr., assignor to The Kerrihard Company, Red Oak, Iowa, a corporation of Iowa Application June 22, 1939, Serial No. 280,500

4 Claims. (Cl. 62—53)

This invention relates to the art of preserving perishable edibles and more particularly to display ice boxes.

It is an object of the invention to provide a mechanism for distributing water over such of the area of the interior of an ice box as may be desired for the purpose of maintaining edibles, particularly fruits and vegetables in a crisp and wholesome condition, said water being derived from and during a melting of cakes of ice or the like in said box or from a suitable source of supply of chilled or cold water.

Other and further objects and advantages of the invention will be understood from the following description thereof.

Figure 1:
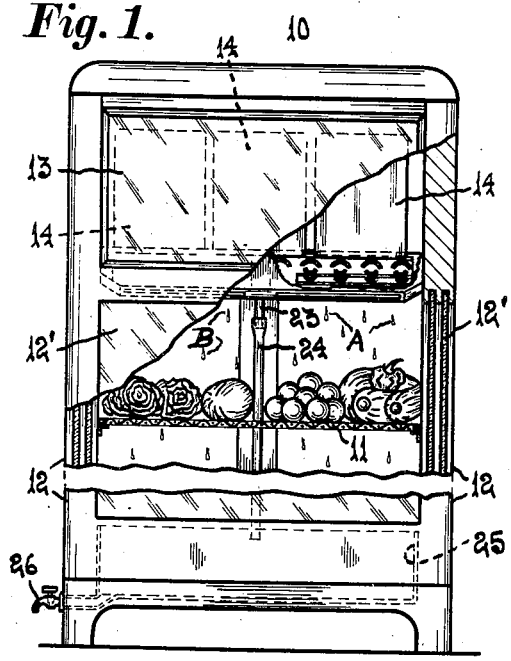
Figure 1 is a front elevation, partly in section and partly broken away, of an ice box embodying the present invention.
Figure 2:
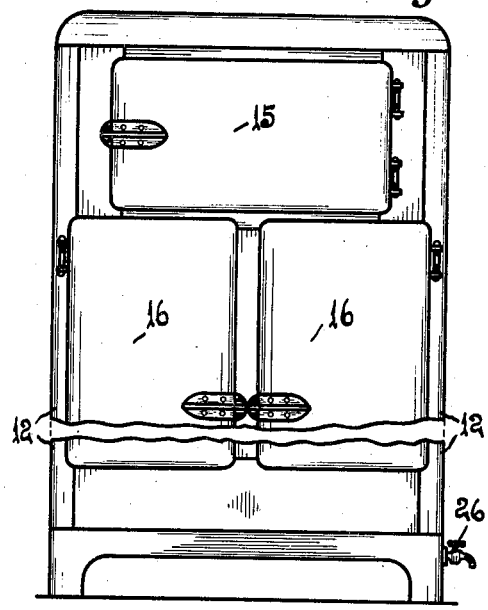
Figure 2 is a rear elevation thereof.

It is well known that certain edibles, more particularly, vegetables deteriorate and become unfit for human consumption more rapidly than others and more particularly at times when certain fruits and vegetables are permitted to come into direct contact with ice water and that certain other fruits and vegetables are best preserved by direct contact with ice water. It is also well known that tomatoes, wax beans, green onions and asparagus are best preserved with a comparatively small amount of contact with ice water; vegetables which are best preserved in a temperature of low degree without direct contact with cold water include among others dry onions, potatoes, red green peppers, green peas and cauliflower; that vegetables which are best preserved by a comparatively large amount of contact with ice water or the like include lettuce, celery, radishes, carrots and beets.

It is further well known that especially in small grocery stores it is impractical for vending purposes to display each of the several above mentioned types of vegetables in an individual ice box for each and that the practice heretofore has been to place said several types of vegetables in a single display ice box in a manner whereby said several different kinds of vegetables receive an equal amount of contact with ice water and the present invention aims to obviate certain undesirable factors of the prior practice.

Referring now to the drawings for a more particular description 10 indicates generally an ice box provided with any desired number of transversely disposed foraminous trays 11 therein supported from the end walls 12 thereof by any suitable means. Certain portions of the front and end walls of the box include spaced apart glass plates 12' whereby the interior of the box may be visualized by prospective purchasers of the edible merchandise displayed within the box, the upper portion of the latter preferably being provided upon the upper front wall portion thereof with a mirror 13.

In the upper part of the box 10 blocks of ice 14 are preferably provided which may be inserted through the doorway opening for the rear door 15 at times when the latter is in an open position, said vegetables being removable from the interior of the box 10 at times when the rear doors 16 are in an open position.

Figure 3:
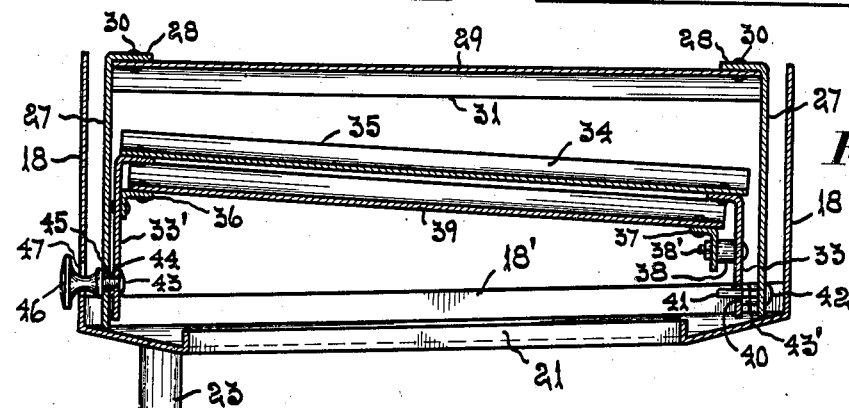
Figure 3 is a transverse vertical section taken on the line 3—3 of Figure 4 of the preferred embodiment of the water distributor of the invention.
Figure 4:
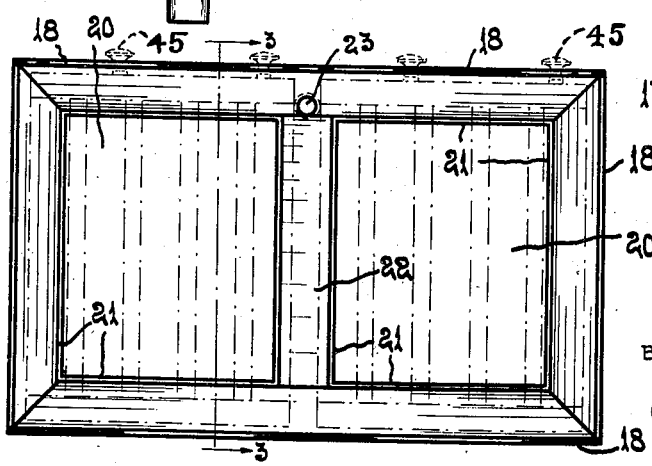
Figure 4 is a top plan view of a drain-pan trap employed, said distributor being represented thereon in dotted lines.
Figure 5:
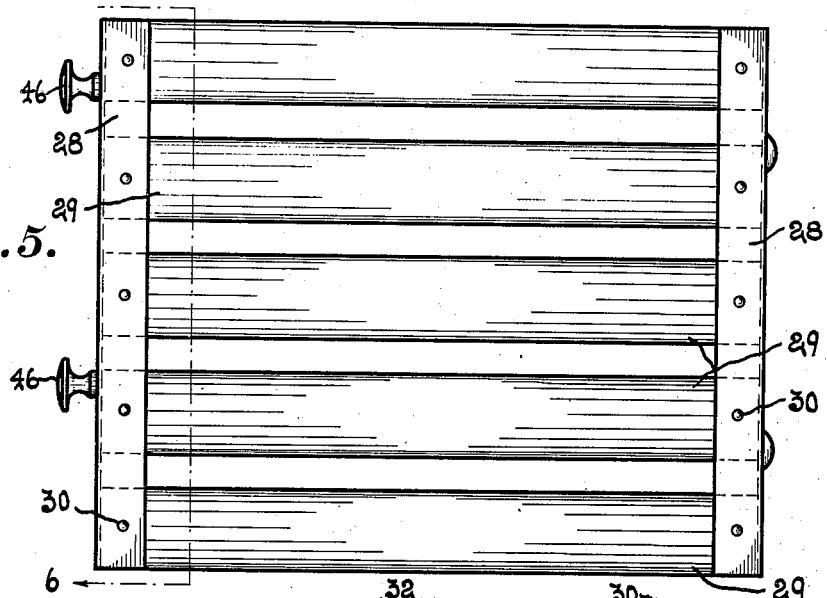
Figure 5 is a top plan view of the distributor shown in Figure 3.

The present invention further includes a pan generally indicated at 17 in Figure 4 having side walls or flanges 18 and 18', the latter, if desired, being of a lesser height than the walls 18 as shown in Figure 3, said walls of the pan 17 being secured directly to the interior, vertical walls of the ice box by any suitable keepers, not shown, or otherwise suitably carried in a vertical position by the walls of the box 10.

As best shown in Figure 4, the pan 17 is provided with two like openings 20 which are preferably rectangular in plan, the perimeters thereof being provided with flanges 21 which are vertically disposed closely adjacent to the outer walls 18 and 18' of the pan whereby the area of each of the openings 20 is comparatively large with respect to the area of the pan.

The pan is provided with a divisional portion 22 between the openings 20 which, together with other portions of the bottom of the pan, are so arranged that in use said bottom is so disposed and so shaped with respect to the outer walls of the pan that, as shown in Figure 3, said bottom is inclined towards a drain pipe 23 for the purpose of conducting water received on the bottom of the pan to said pipe, the latter, as shown in Figure 1, being connected to and in communication with a cooperative extension pipe 24 whereby water which moves downwardly of the pipe 24 is conducted to a sump 25. The sump is formed of sheet metal and is disposed adjacent the bottom of the box 10, said sump being provided with a drain off cock 26.

In addition to the drip-pan 17 the invention further includes one or more water distributor or deflector units which are each constructed alike and, therefore, the construction of one only thereof will be minutely described herein. Each said unit is of an area in plan greater than the area of an opening 20 and in use each unit overlaps the flanges 21 of the perimeter of its respective opening as best shown in Figure 4.

A water distributor unit in addition to the drip-pan 17 includes a frame portion preferably consisting of a pair of oppositely disposed spaced apart supporting plates 27 which are vertically disposed in use upon the pan 17, each said supporting plate being provided with an inwardly disposed flange 28. In use the plates 27 are, respectively, disposed adjacent to the front and back wall of the box 10 for facilitating manipulation of certain later described detent knob nuts.

Figure 6:
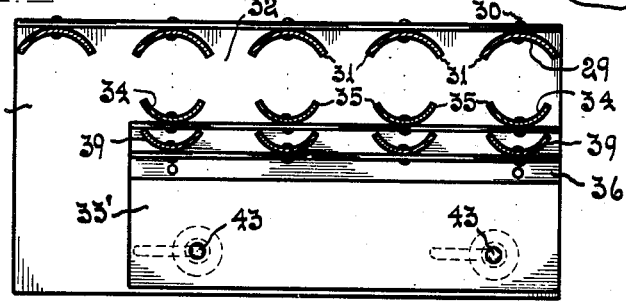
Figure 6 is a transverse section taken on line 6—6 of Figure 5 and showing certain troughs employed in an approximate neutral position.
Figure 7:
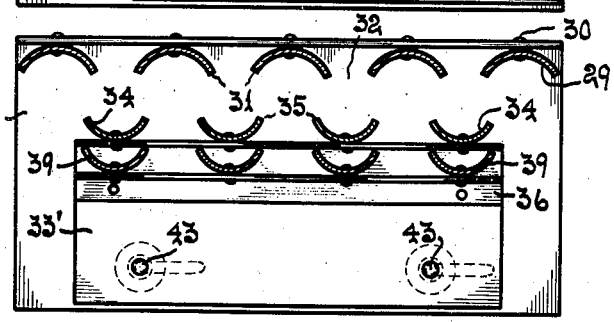
Figure 7 is a view similar to Figure 6 and showing said troughs in an operative position.
Figure 8:
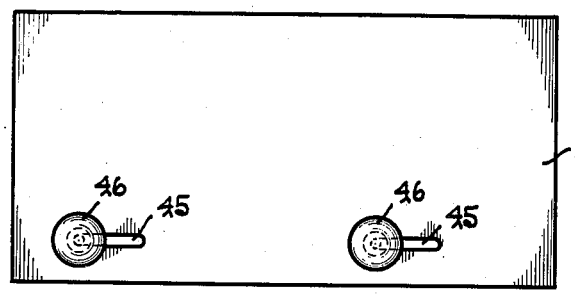
Figure 8 is an end view of a distributor unit, said drain-pan being omitted.

Between the flanges 28 a plurality of equidistantly spaced apart metallic slats 29 are provided, the opposite ends thereof being secured to their respective adjacent flanges 28 by any suitable means such as spot welding or the rivets 30. Each slat 29 is preferably arcuate in cross section and, as best shown in Figures 6 and 7, the oppositely disposed edges 31 of each slat are disposed downwardly in use for directing ice water to and through the spaces 32 provided between the slats 29, the latter being adapted to support a block of ice thereon. The slats together with the supporting plates 27 in use remain in a fixed position across and above an opening 20 of the pan 17, said plates being spaced apart a distance substantially equal to the distance between their respective parallel side wall 18 of the pan 17.

Between the plates 27 of the frame for supporting the slats 29, oppositely and vertically disposed trough supporting members 33 and 33′ are provided. Preferably the trough support 33′ extends slightly higher than the trough support 33 whereby the troughs 34 are slightly inclined during use for purposes later described. The troughs 34 are similar to the heretofore described slats 29 and similarly secured to inwardly disposed flanges of the trough supports 33 and 33′, said trough support flanges preferably being employed. The side edges 35 of the troughs 34 are disposed upwardly with respect to the main body portion of the troughs, as shown in Figure 6.

The trough support 33′ is provided with a shelf 36 and the member 33 is provided with a similar shelf 37, the latter being spaced from the trough support 33 by spacing blocks 38 which are disposed between the shelf 37 and the member 33, said blocks being secured to the member 33 and to the shelf 37 by suitable bolts 38′.

Disposed between and secured to the shelves 36 and 37 secondary troughs 39 are provided. A secondary trough 39 is disposed beneath each one of the troughs 34 and at times when moisture condenses upon the lower surfaces of the troughs 34 and drips downwardly therefrom, the drops of moisture become trapped in the secondary troughs 39, the latter also being inclined in use whereby moisture received in the secondary troughs is conducted to the drip-pan 17.

The supporting member 33 is provided with a pair of spaced apart aligned, elongated slots 40, through each of which a bolt shank 41 extends. The heads 42 of said bolts are secured to an adjacent portion of a supporting plate 27 and spacing nuts or other suitable spacing elements 43′ are provided between the supporting plate 27 and the trough supporting member 33 whereby water may readily drip or fall downwardly from the lower ends of the troughs 34 through said space and onto the drip pan 17. The supporting member 33′ is provided with a pair of spaced apart horizontally aligned bolts having heads 43 secured thereto, the threaded shanks 44 of the bolts being disposed through portions of the adjacent supporting plate 27 and the latter is provided with an elongated aperture 45 for each bolt shank 44 whereby the latter are disposed through and longitudinally slidable of their respective aperture 45. The outer ends of the bolt shanks 44 are each provided with a knob nut 46. The medial portion of each knob nut 46 is disposed through and longitudinally slidable with respect to an elongated aperture 47 provided through the adjacent wall 18 of the drip pan 17.

The blocks of frozen water 14 are preferably employed since the ice water is held latent therein and slowly released and dribbles slowly from the blocks as the latter melt and become activiated, through said melting from their normally dormant condition. Cold water of low thermal degree or ice water may be provided and introduced into the interior of the box 10 adjacent the top thereof from other suitable source of supply of said water for distribution and portions thereof deflected by the mechanism herein described in cooperation with said box for uses and purposes later described.

The box 10 is adapted to display the edibles stored therein upon the foraminous trays 11.

As thus described it will be noted that at times when water which is suitably cold is introduced in the top of the box 10 and above the slats 29 that the latter being spaced distribute drops of water over an area complemental to the area of said spaces at times when said water dribbles downwardly from said suitable source of supply of said cold water and that said dribble water or drops of water falling downwardly in vertical alignment with the spaces 32 between the slats 29 become distributed and sprayed upon the merchandise supported by the foraminous trays 11 before falling into the sump 25 at the bottom of the box where said cold water may be retained for lowering the thermal condition of the entire interior of the box and that said sprayed water drops which fall upon the merchandise may be limited as to the quantity thereof by shifting the troughs 34 with respect to the slats 29 and the spaces 32 between said slats whereby a desired portion of said sprayed water becomes deflected from its normal downward course and trapped in the troughs 34 and conducted from the latter to the pan-tray 19 and drain pipe 23, the latter being cooperatively attached to the vertically disposed drain pipe extension 24 whereby said deflected water is conducted to the sump 25 indirectly and without contact with said merchandise.

In operation it will be understood that for the conventional grocery store display ice box two of the specifically described distributor units are employed which are arranged in the interior of the ice box and with respect to the drain-tray 17, as shown in Figure 1, whereby vegetables which are best preserved or maintained crisp by a larger contact with said water may be placed in vertical alignment with one of the distributor units upon the several foraminous trays 11 within the box and vegetables which require a comparatively lesser amount of water may be disposed at the opposite side of the box and in vertical alignment with the other distributor unit and the trough-louvers 34 of each unit placed in a selected position with respect to their slats 29 whereby as indicated by the larger number of drops of dribble water at one side of the box 10, as shown in Figure 1, the vegetables on that side of the box receive a larger amount of direct contact with said water than the vegetables at the other side of the box 10 where the lesser quantity of drops B are permitted to fall toward the tray 11. Obviously, vegetables being seasonal in production as to several different types of vegetables the troughs 34 can be shifted correspondingly and locked in a selected position by a manipulation of the knob nuts 46 for preventing unauthorized persons from changing the positions of the troughs 24 with respect to the spaces 32.

From the foregoing description it is thought to be obvious that a water distributor for ice boxes constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:

1. In a water distributor for an ice box, a frame adapted to be disposed in said box, a plurality of spaced apart slats carried by said frame, said slats being adapted to support a block of frozen water thereon and to permit water to drip from said block through said spaces during a melting of said block for distributing drops of water over an area complemental to the area of said spaces, a plurality of spaced apart troughs disposed under said slats, means for simultaneously shifting said troughs with respect to said slats for causing a preselected quantity of said drip water to be trapped in said troughs, and means for conducting trapped drip water away from said troughs.

2. A water distributor for an ice box comprising a drip-pan provided with a drain-pipe and a medially disposed opening, said pan being adapted to be secured to the inner walls of said box, spaced apart plates carried by said pan, a plurality of spaced apart slats secured to said plates and disposed across said opening, said slats being adapted to support a block of frozen water thereon, a plurality of troughs disposed across said opening between said pan and slats, said troughs being arranged to trap drip water passed between said slats from said block and to deliver trapped water to said pan, and means for selectively disposing said troughs relative to the spaces between said slats for varying the quantity of water trapped.

3. A water distributor as defined in claim 2 which further includes a secondary trough disposed directly under each water trapping trough for preventing moisture disposed on the under surfaces of said trapping troughs from falling through said opening of said drip-pan.

4. In combination, a display ice box, an open sump disposed in said box, a foraminous tray in said box for supporting edibles thereon above said sump, a source of supply of cold water, means for causing said water to dribble from said source over said edibles, and deflector means for causing a portion of said dribble water to be conducted to said sump for preventing said portion from contact with said edibles.

FRANCIS A. KAVAN.